Dec. 26, 1961 A. ERNST 3,014,287
TERRESTRIAL GLOBE WITH INNER LIGHTING SIMULATING THE
REAL ILLUMINATION OF THE SUN
Filed Feb. 2, 1959 2 Sheets-Sheet 1
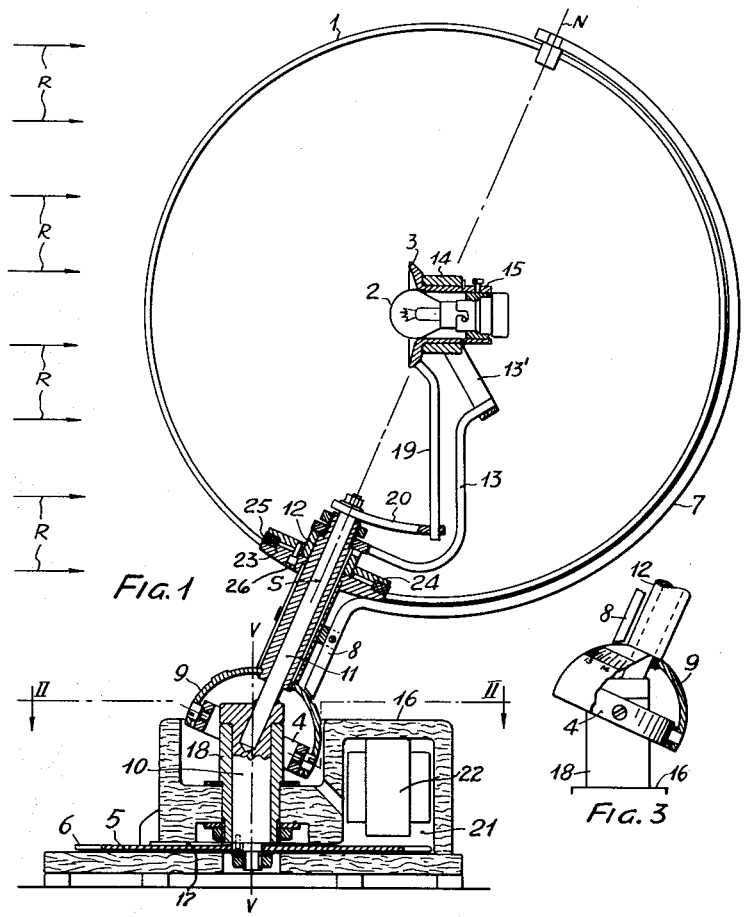
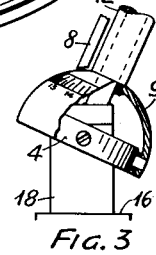
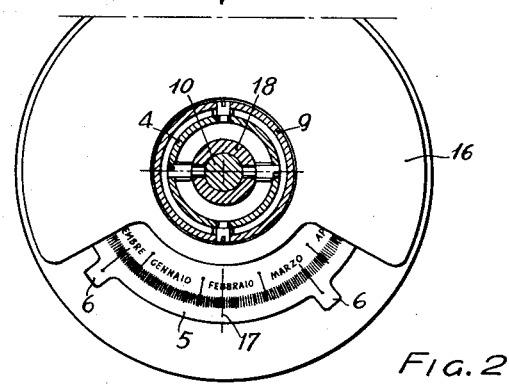
INVENTOR
Alfred Ernst
BY
Bailey, Stephens & Huettig
ATTORNEYS

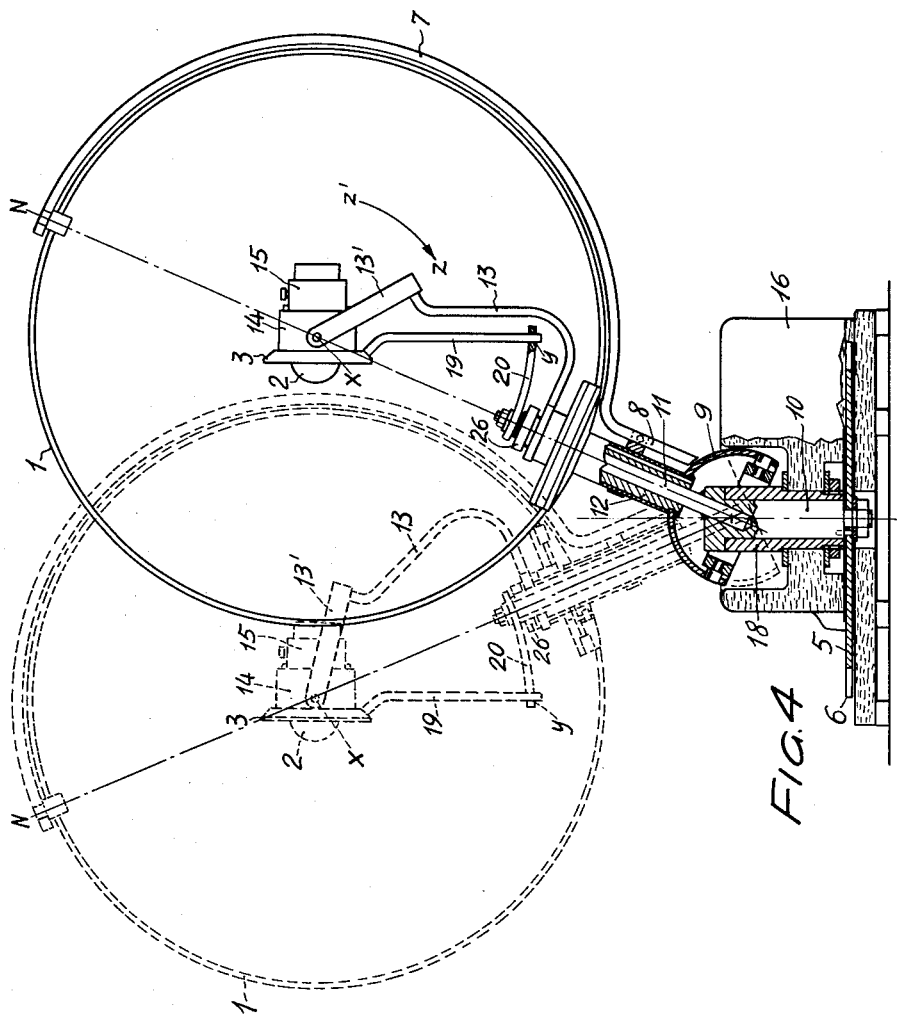

United States Patent Office 3,014,287
Patented Dec. 26, 1961

3,014,287
TERRESTRIAL GLOBE WITH INNER LIGHTING SIMULATING THE REAL ILLUMINATION OF THE SUN
Alfred Ernst, Via Magenta 10, Varese, Italy
Filed Feb. 2, 1959, Ser. No. 790,611
Claims priority, application Italy Feb. 15, 1958
10 Claims. (Cl. 35—47)

The object of the present invention is to realize a terrestrial globe with inner lighting simulating the real illumination of the sun and its variation in the various hours of the day and periods of the year.

As is well known from astronomy, the illumination of the earth varies according to the hours and the seasons because the earth rotates about its polar axis and this polar axis is inclined and in turn, rotates about a vertical axis so that the illumination of the earth's surface will vary if the sun is supposed steady.

Therefore to have a terrestrial globe lighted as it would be illuminated by the sun, it is necessary to have the terrestrial globe move in the same way as the earth moves keeping the luminous source steady. The same result of course could be obtained by keeping the terrestrial globe steady and varying the relative position of the luminous source with respect to the globe. However this last method would be conceptually less exact than the preceding one.

The terrestrial globe according to the present invention comprises an illumination device set in the center point of a translucent globe, which may be displaced with respect to said illumination device, so that the lighting beams always hit a hemispheric surface no matter what is the position of the terrestrial globe with respect to the illumination device.

Thanks to said terrestrial globe it is possible to perform several computations and studies which will be apparent at once to every expert in the art who carefully examines the following specification, wherein a particular embodiment of the present invention, is described by way of example only without limiting the invention and is illustrated in the annexed drawings in which:

FIG. 1 shows a cross vertical section of a terrestrial globe realizing the inventive principle of the invention;

FIG. 2 is a plan section taken along the line II—II of FIG. 1 looking downwards in the sense of the arrows.

FIG. 3 is a partially sectioned side view of a constructive detail of FIG. 1.

FIG. 4 shows the movement of the parts.

The terrestrial globe according to the invention comprises an ellipsoid reproducing the terrestrial globe 1, constituted by two hollow hemispheres of translucent material, in the inner central part of which a bulb 2 provided with a screen 3 is mounted so as to produce a hemispherical lighting. According to such an illumination system the bulb must always be turned towards the same direction and the screen must always be kept vertical during the movements of the globe 1, in order to obtain a lighting effect equivalent to the one due to a luminous source placed externally at an infinite distance, that is equivalent to the illumination due to the solar beams shown in FIG. 1 by the arrows R.

As it is usually done in the conventional terrestrial globes the globe 1 is so mounted on its base 16 as to rotate about its polar axis NS inclined with a particular angle with respect to the normal VV.

To obtain the rotation of the polar axis NS, about the vertical axis VV, the lower end of said axis NS extends beyond the South Pole S with an inclined pin 11 fixed to a vertical pin 10, the lower end of which is connected to a disc 5, which rotates said pin 10. Said disc 5 is contained in the base 16 and is partially visible through a cut-away portion of the base which is here provided with a fixed pointer 17. The periphery of said disc 5 is divided in months which, in turn, are subdivided in days and is preferably provided with projections 6 serving at the same time as grip means to angularly displace said disc and as dividing marks for the different seasons being placed in correspondence to the days of separation of one season from the other.

To always keep the illumination in the same direction, as the drawing embodiment shows, the following arrangement has been provided: the bulb 2 and its relative screen 3, the latter being incorporated with the cylinder or socket member 15, are revolvingly mounted in a cylindrical body or sleeve 14 pivoting on a C shaped support 13, constituting an arm fixed at its lower end to a sleeve 12 and a fork 13'. Said sleeve 12 externally surrounds with a certain clearance the inclined pin 11, the lower end of which is fixed to a semi-sphere 9 of a universal joint 4. The inner ring of the joint 4 is pivoted on a sleeve 18 surrounding the vertical pin 10 and fixed to a base 16. The pin 10 is fixed to inclined pin 11.

In order to always keep the screen 3 vertical its lower end is fixed to the upper end of a stem or link 19 the other end of which is pivoted to an arched arm 20 fixed to the upper end of the inclined pin 11. The axis of the stem 19 is therefore always parallel to the axis of the pin 10 and is as this last, always normal to base 16.

Other systems for transmitting the relative movements to the different parts of the globe could obviously be used as long as they would give the same results.

The equatorial line of the hemispheric 9 is subdivided in the different hours of the day, the hour 12 or midday being indicated in the direction of the imaginary beams R that is in a plane normal to the one of the screen 3. A pointer 8 fixed to a meridian 7 revolvingly mounted with respect to the terrestrial globe 1 is suited to indicate time on the scale provided on the equatorial line of the hemisphere 9.

The support base 16 may have a hollow 21 and a transformer 22 may be therein arranged in order to fit the lamp 2 to main voltage by which the globe is supplied.

The mounting of the lamp 2 with its screen 3 and accessories 13, 14, 15, 19 and 20 is realized by two washers 23 and 24, the rubber ring 25 and screw 26 being set between. These washers 23 and 24 will be wide enough to fit in a suitable hole at the globe bottom in order to introduce therein the lamp with its screen and accessories which, as the drawing shows, are suitably small.

Many are the problems which may be solved with a similar terrestrial globe. Some of them will be described by way of example in the following part of this specification.

Supposing one wants to know the illumination of the earth on a chosen day, the disc 5 is rotated until pointer 17 points at that day, whereby the polar axis NS assumes the real position it has on such a day. For the above specified reasons the illuminated hemisphere corresponds to the one individuated by the vertical screen 3.

The meridian 7 may be then disposed to pass through a town being on the separation line between light and darkness, whereafter it is possible to determine at what hour of the day the sun rises and sets that particular day in that town, as well as in all the other towns being on the same latitude.

The hour of the sunrise and sunset is naturally indicated with reference to the local hour-system of the single towns.

If a town is on the separating line between light and darkness and the meridian 7 is disposed to pass through another town or for instance through the meridian of Greenwich, it is possible to determine at which hour of the day the sun rises and sets in the first mentioned towns referring however to the hour-system of the second town or of the meridian of Greenwich.

It is obvious that many other problems, which can be easily solved with the help of the terrestrial globe according to the present invention, may be set by the expert in this broad of the technique.

Other variations and modifications of the specified terrestrial globe are possible without departing from the field of the present invention.

What I claim is:

1. A globe for simulating the illumination of the earth by the sun comprising a translucent shell of substantially spherical shape, a base, a shaft mounted for rotation in said base about a vertical axis, an inclined shaft rigid with said vertical shaft, means mounting said globe on said inclined shaft with its north-south axis coincident with the axis of the inclined shaft, a sleeve surrounding said inclined shaft, a universal joint connecting said sleeve to said base permitting freedom of movement about two axes whose intersection lies in said vertical axis, an arm member rigid within the shell with said sleeve and extending to a point adjacent the center of the shell, a light source holding means pivotally connected to the end of the arm member remote from the sleeve, a second arm within the shell rigid with said inclined shaft and extending to a point below the center of the shell, a link connected to said light source holding means and pivoted to said second arm at such point, means carried by said light source holding means to limit the illumination from a light source held thereby to one-half the interior of the shell, whereby to maintain the direction of emission from the light source always in one direction during movements of the shell about said vertical axis.

2. In a globe as claimed in claim 1, said light source holding means comprising a socket member and a sleeve rotatable thereon, said sleeve being pivotally connected to said first arm and said socket member being rigid with said link.

3. In a globe as claimed in claim 1, said axes of freedom of movement intersecting at the intersection of the axes of said inclined and vertical shafts.

4. In a globe as claimed in claim 1, said direction of emission being perpendicular to said vertical axis.

5. In a globe as claimed in claim 1, a disc secured to said vertical shaft having a scale thereon, and a pointer carried by base cooperating with said scale.

6. In a globe as claimed in claim 5, said light source holding means comprising a socket member and a sleeve rotatable thereon, said sleeve being pivotally connected to said first arm and said socket member being rigid with said link.

7. In a globe as claimed in claim 6, said axes of freedom of movement intersecting at the intersection of the axes of said inclined and vertical shafts.

8. In a globe as claimed in claim 7, said direction of emission being perpendicular to said vertical axis.

9. A globe for simulating the illumination of the earth by the sun comprising a base, a translucent shell of substantially spherical shape, means mounting said shell for rotation about a first axis inclined to the vertical, said axis of rotation representing the axis of the daily rotation of the earth, and for translatory movement in a circular path about a second and vertical axis intersecting said inclined axis, movement around said second axis representing the yearly motion of the earth around the sun, a source of light within the shell, means limiting the illumination from said light to one-half of the interior of the shell, means mounting and guiding said light source and limiting means to maintain the direction of emission from the light source always in one direction during movements of the shell in said circular path, a reference meridian mounted on said globe so as to rotate on its surface and provided with a pointer, a fixed circular scale subdivided in the twenty-four hours of the day, on which the hour twelve or midday is indicated in the direction of greatest illumination, associated with said pointer, a disc having a scale thereon divided into the days and months of the year, means operatively connecting said disc to said shell to turn with translatory movements of the shell, and a pointer carried by said base cooperating with said last scale.

10. In a globe as claimed in claim 9, said direction of emission being perpendicular to said vertical axis.

References Cited in the file of this patent

UNITED STATES PATENTS

| 506,084 | Turnbull | Oct. 3, 1893 |
| 1,515,135 | Alexander | Nov. 11, 1924 |
| 1,814,984 | Vanderhinder | July 14, 1931 |
| 2,544,057 | Vanderhinder | Mar. 6, 1951 |

FOREIGN PATENTS

| 717,293 | Great Britain | Oct. 27, 1954 |
| 857,291 | Germany | Feb. 5, 1953 |